C. MONTAGUE.
Devices for Reducing Friction in Machinery.
No. 151,502. Patented June 2, 1874.
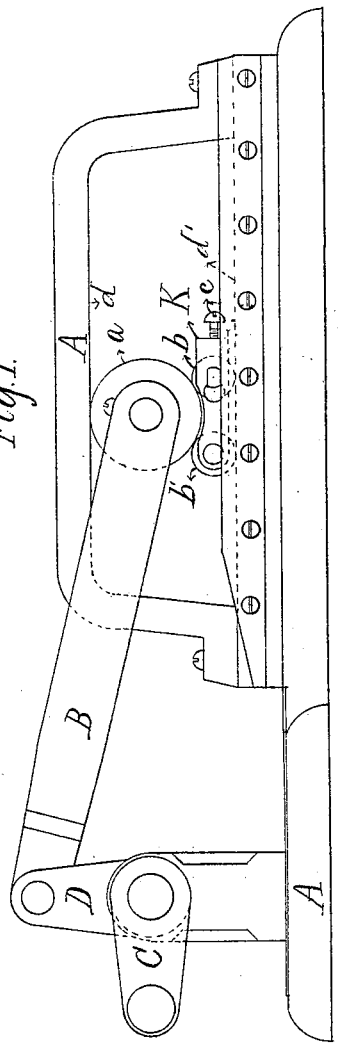
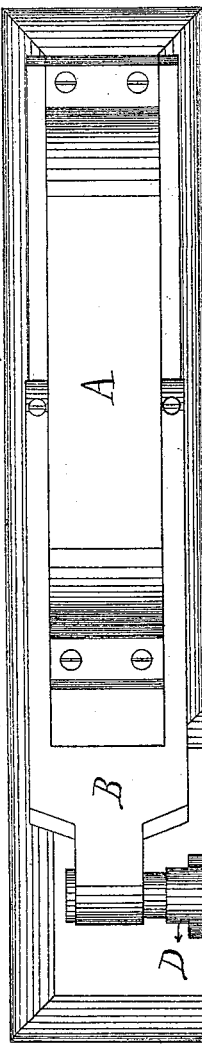
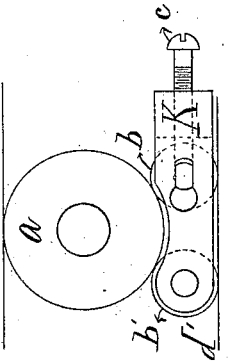
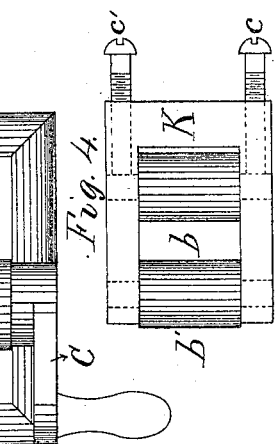

UNITED STATES PATENT OFFICE.

CHARLES MONTAGUE, OF BOSTON, MASSACHUSETTS, ASSIGNOR TO CYRIL C. CHILD, OF SAME PLACE.

IMPROVEMENT IN DEVICES FOR REDUCING FRICTION IN MACHINERY.

Specification forming part of Letters Patent No. 151,502, dated June 2, 1874; application filed February 12, 1874.

*To all whom it may concern:*

Be it known that I, CHARLES MONTAGUE, of Boston, Massachusetts, have invented Mechanism for Saving Friction, of which the following is a specification:

The nature of my invention consists in a device by which friction is reduced and close-working fits maintained between parallel surfaces.

Figure I is a side elevation of my improvement. Fig. II is a plan view. Fig. III is an elevation of friction-rolls. Fig. IV is a plan view of friction-rolls and frame for securing them.

The large friction-roll $a$ is propelled back and forth in the chamber of frame A by the crank C, operating through crank D and pitman B, the outside of the roll $a$ having contact with the surface $d$ of the chamber of frame A, and also with the surfaces of friction-rolls $b$ and $b'$, which latter rolls are in contact with the surface $d'$ of the chamber, surfaces $d$ and $d'$ being parallel with each other. The small friction-rolls $b$ $b'$ are so held in the frame K that they may be adjusted nearer each other by the screws $c$ $c'$, and thereby the rollers $b$, $b'$, and $a$ shall be made to come in contact with the opposite inner surfaces of the frame A. The contact of the roll $a$ with rolls $b$ $b'$ combines, with the contact of the rolls and the parallel surfaces $d$ $d'$, to compel the revolution of all the rolls, the rolling friction of which is much less than that of other kinds of slides which are commonly used in similar positions. Frame K may be in one or two parts, and the pitman or its equivalent may be attached to frame K, instead of to roll $a$.

This device is adapted to many places, such as steam-engines, and has also been combined with the crank-pin and rocking lever of a printing-press, for which I have made application for patent, filed March 19, 1873.

I claim as my invention—

1. Three rolls, $a$, $b$, and $b'$, held in frame K, arranged to operate between two parallel surfaces, whereby two of said rolls, $b$ and $b'$, are held in rolling contact with one parallel surface and roll $a$, while roll $a$ is also in rolling contact with the other parallel surface, substantially as described.

2. The friction-rolls $a$, $b$, and $b'$, arranged to operate between two parallel surfaces, in combination with frame K and means of adjustment, substantially as described.

Boston, Massachusetts, February 9, 1874.

CHARLES MONTAGUE.

Witnesses:
C. WATTS L. MONTAGUE,
FRANK D. WITHERELL.